US012783036B2

(12) United States Patent
Saiki et al.

(10) Patent No.: US 12,783,036 B2
(45) Date of Patent: Nov. 3, 2026

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventors: Takaki Saiki, Kanagawa (JP); Masahito Shikata, Kanagawa (JP); Kazuhiko Narushima, Kanagawa (JP); Hidenori Horie, Kanagawa (JP); Yuji Murata, Kanagawa (JP); Masayoshi Miki, Kanagawa (JP); Koji Udagawa, Kanagawa (JP); Dai Takeshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/885,513

(22) Filed: Aug. 10, 2022

(65) Prior Publication Data

US 2023/0305613 A1 Sep. 28, 2023

(30) Foreign Application Priority Data

Mar. 25, 2022 (JP) ................................ 2022-049600

(51) Int. Cl.
*G06F 1/3206* (2019.01)
*G06F 1/3234* (2019.01)
(Continued)

(52) U.S. Cl.
CPC .......... *G06F 1/3206* (2013.01); *G06F 1/3284* (2013.01); *G06F 3/14* (2013.01); *H04N 1/00891* (2013.01); *H04N 1/00896* (2013.01)

(58) Field of Classification Search
USPC ........................................ 713/320, 323, 340
See application file for complete search history.

(56) References Cited

U.S. PATENT DOCUMENTS 7,383,457 B1 * 6/2008 Knight ...................... G06F 1/32 713/323
9,898,064 B2 * 2/2018 Goda .................... G06F 1/3275
(Continued)

FOREIGN PATENT DOCUMENTS

JP 2008118534 5/2008
JP 2009092713 4/2009
(Continued)

OTHER PUBLICATIONS

"Search Report of Europe Counterpart Application", issued on Jul. 25, 2023, p. 1-p. 11.
(Continued)

*Primary Examiner* — Jaweed A Abbaszadeh
*Assistant Examiner* — Cheri L Harrington
(74) *Attorney, Agent, or Firm* — JCIPRNET

(57) ABSTRACT

An information processing apparatus includes a processor configured to change a power saving setting of an apparatus to a third setting in which a power saving effect is higher than in a second setting based on a usage status of the apparatus in a case where the power saving setting of the apparatus is changed from a first setting to the second setting; in which the first setting is a default setting of the apparatus, and the second setting is different from the third setting.

10 Claims, 5 Drawing Sheets

(51) Int. Cl.
*G06F 3/14* (2006.01)
*H04N 1/00* (2006.01)

(56) References Cited

U.S. PATENT DOCUMENTS

2007/0050653 A1* 3/2007 Verdun ................. G06F 1/3228 713/320
2010/0100755 A1* 4/2010 Lin ....................... G06F 1/3215 713/324
2010/0235664 A1* 9/2010 Karlsson ............... G06F 1/3228 713/323
2011/0131436 A1* 6/2011 Ogashiwa .......... G03G 15/5004 713/323
2011/0283121 A1* 11/2011 Kuroda ................. G06F 1/3203 713/310
2013/0054998 A1* 2/2013 Wyatt ................... G06F 1/3206 713/323
2014/0157026 A1* 6/2014 So ......................... G06F 1/3206 713/323
2014/0173298 A1* 6/2014 Bircher ................. G06F 1/3203 713/300
2014/0241745 A1 8/2014 Imaoka
2016/0103481 A1* 4/2016 Griffith ................... G06F 1/324 713/323
2016/0247144 A1* 8/2016 Oh ......................... G06K 7/083
2017/0068308 A1* 3/2017 Park ....................... G06F 1/3228
2019/0041947 A1* 2/2019 Natarajan ........... G06F 13/4282
2021/0240410 A1* 8/2021 Saegusa ................ G06F 1/3209
2022/0317757 A1* 10/2022 Rao ........................ G06F 1/3206

FOREIGN PATENT DOCUMENTS

JP 2011239306 11/2011
JP 2014167499 9/2014
JP 2019055568 4/2019

OTHER PUBLICATIONS

"Notice of Reasons for Refusal of Japan Counterpart Application", issued on Apr. 21, 2026, with English translation thereof, p. 1-p. 3.
"Notice of Reasons for Refusal of Japan Counterpart Application", issued on Jan. 27, 2026, with English translation thereof, pp. 1-9.

* cited by examiner

| TARGET LEVEL | AMOUNT OF POWER CONSUMPTION [Wh] | AVERAGE RETURN TIME [SECONDS] (OPERATION PANEL) |
|---|---|---|
| 1 | 12000 | 0.5 |
| 2 | 8000 | 1.0 |
| 3 | 5000 | 1.5 |
| 4 | 2000 | 2.5 |
| 5 | 1000 | 3.5 |

FIG. 6

| MODE OF APPARATUS | | POWER VALUE [W] | OPERATION TIME [MINUTES] | AMOUNT OF POWER [Wh] | TOTAL [Wh] |
|---|---|---|---|---|---|
| OPERATING MODE | WARM-UP MODE | 1200 | 7 | 140 | 8947 |
| | PRINT MODE | 900 | 58 | 870 | |
| | SCAN MODE | 200 | 11 | 37 | |
| STANDBY MODE | | 150 | 1800 | 4500 | |
| POWER SAVING MODE | LOW POWER (LP) MODE | 80 | 2500 | 3333 | |
| | SLEEP (SLP) MODE | 1 | 4000 | 67 | |

FIG. 7

| MODE OF APPARATUS | | RETURN TIME [SECONDS] | | NUMBER OF TIMES OF RETURNING | AVERAGE RETURN TIME [SECONDS] | |
|---|---|---|---|---|---|---|
| | | OPERATION PANEL | FIXING DEVICE | | OPERATION PANEL | FIXING DEVICE |
| STANDBY MODE | | 0 | 0 | 55 | 0.75 | 2.22 |
| POWER SAVING MODE | LOW POWER (LP) MODE | 1 | 3 | 32 | | |
| | SLEEP (SLP) MODE | 3 | 5 | 15 | | |

FIG. 8

| MODE OF APPARATUS | | POWER VALUE [W] | OPERATION TIME [MINUTES] | AMOUNT OF POWER [Wh] | TOTAL [Wh] |
|---|---|---|---|---|---|
| OPERATING MODE | WARM-UP MODE | 1200 | 7 | 140 | 6964 |
| | PRINT MODE | 900 | 58 | 870 | |
| | SCAN MODE | 200 | 11 | 37 | |
| STANDBY MODE | | 150 | 100 | 250 | |
| POWER SAVING MODE | LOW POWER (LP) MODE | 80 | 4200 | 5600 | |
| | SLEEP (SLP) MODE | 1 | 4000 | 67 | |

FIG. 9

| MODE OF APPARATUS | | RETURN TIME [SECONDS] | | NUMBER OF TIMES OF RETURNING | AVERAGE RETURN TIME [SECONDS] | |
|---|---|---|---|---|---|---|
| | | OPERATION PANEL | FIXING DEVICE | | OPERATION PANEL | FIXING DEVICE |
| STANDBY MODE | | 0 | 0 | 15 | 1.15 | 2.85 |
| POWER SAVING MODE | LOW POWER (LP) MODE | 1 | 3 | 72 | | |
| | SLEEP (SLP) MODE | 3 | 5 | 15 | | |

FIG. 10

| MODE OF APPARATUS | | POWER VALUE [W] | OPERATION TIME [MINUTES] | AMOUNT OF POWER [Wh] | TOTAL [Wh] |
|---|---|---|---|---|---|
| OPERATING MODE | WARM-UP MODE | 1200 | 7 | 140 | 4725 |
| | PRINT MODE | 900 | 58 | 870 | |
| | SCAN MODE | 200 | 11 | 37 | |
| STANDBY MODE | | 150 | 100 | 250 | |
| POWER SAVING MODE | LOW POWER (LP) MODE | 80 | 2500 | 3333 | |
| | SLEEP (SLP) MODE | 1 | 5700 | 95 | |

FIG. 11

| MODE OF APPARATUS | | RETURN TIME [SECONDS] | | NUMBER OF TIMES OF RETURNING | AVERAGE RETURN TIME [SECONDS] | |
|---|---|---|---|---|---|---|
| | | OPERATION PANEL | FIXING DEVICE | | OPERATION PANEL | FIXING DEVICE |
| STANDBY MODE | | 0 | 0 | 15 | 1.48 | 3.19 |
| POWER SAVING MODE | LOW POWER (LP) MODE | 1 | 3 | 55 | | |
| | SLEEP (SLP) MODE | 3 | 5 | 32 | | |

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2022-049600 filed Mar. 25, 2022.

BACKGROUND

(i) Technical Field

The present invention relates to an information processing apparatus, a non-transitory computer readable medium storing a program, and an information processing method.

(ii) Related Art

An apparatus having a power saving function has been known.

JP2008-118534A describes an apparatus that acquires an event in which an image forming apparatus enters a power saving state and an event indicating that the image forming apparatus returns from the power saving state, accumulates a type of the acquired event and an occurrence time of the event, and controls a sleep state of the image forming apparatus based on an analysis result of the accumulated information.

SUMMARY

Aspects of non-limiting embodiments of the present disclosure relate to an information processing apparatus, a non-transitory computer readable medium storing a program, and an information processing method that suppress a decrease in a power saving effect in a case where a power saving setting of an apparatus is changed from a default setting to another setting as compared with a case where the other setting is maintained.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to change a power saving setting of an apparatus to a third setting in which a power saving effect is higher than in a second setting based on a usage status of the apparatus in a case where the power saving setting of the apparatus is changed from a first setting to the second setting; and wherein the first setting is a default setting of the apparatus, and the second setting is different from the third setting.

BRIEF DESCRIPTION OF THE DRAWINGS

Exemplary embodiment(s) of the present invention will be described in detail based on the following figures, wherein:

FIG. 6 is a diagram showing energy saving of each mode in a second setting;

FIG. 7 is a diagram showing convenience of each mode in the second setting;

FIG. 8 is a diagram showing energy saving of each mode in a third setting A;

FIG. 9 is a diagram showing convenience of each mode in the third setting A;

FIG. 10 is a diagram showing energy saving of each mode in a third setting B; and FIG. 11 is a diagram showing the convenience of each mode in the third setting B.

DETAILED DESCRIPTION

Figure 1:
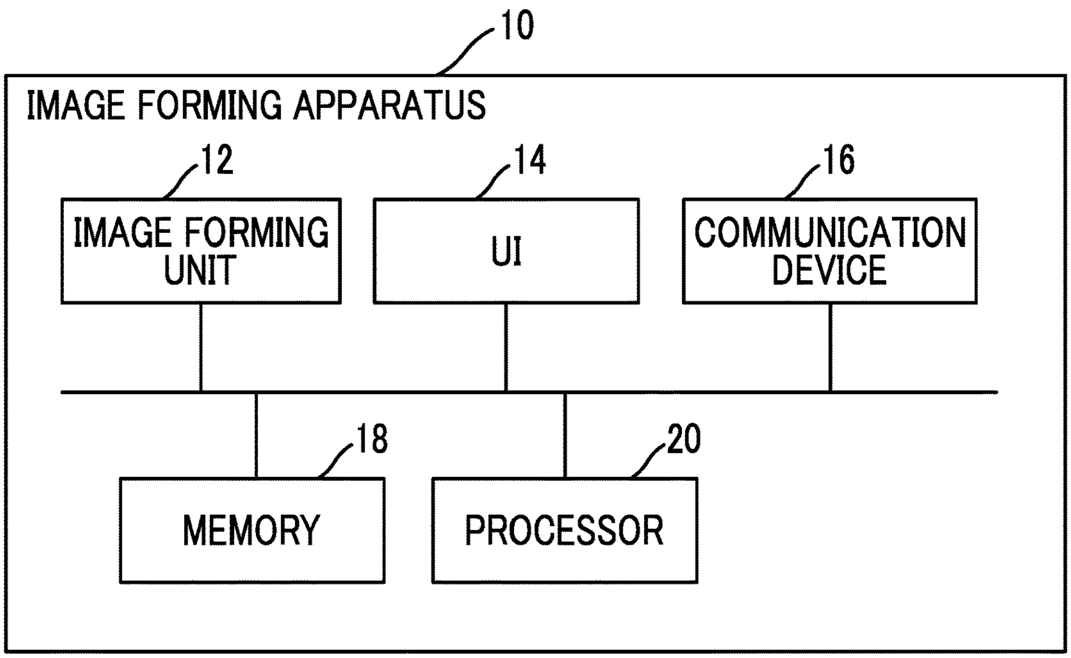
FIG. 1 is a block diagram showing a hardware configuration of an image forming apparatus according to an exemplary embodiment.

An apparatus according to an exemplary embodiment is an apparatus having a function of causing a state of the apparatus to transition to a state of power saving. The apparatus according to the exemplary embodiment may be any apparatus as long as the apparatus is such an apparatus.

The apparatus according to the exemplary embodiment includes an operating state, a standby state, and a power saving state. In the following description, a mode of the apparatus in a case where the state of the apparatus is the operating state is referred to as an "operating mode". The mode of the apparatus in a case where the state of the apparatus is the standby state is referred to as a "standby mode". The mode of the apparatus in a case where the state of the apparatus is the power saving state is referred to as a "power saving mode".

The state of the apparatus in the operating mode is a state where power is supplied to each part constituting the apparatus and each part is operating. For example, a state where the apparatus is being warmed up or a state where processing is being executed is the state of the apparatus in the operating mode. The state where the apparatus is being warmed means that the apparatus is powered on and the apparatus can execute processing.

The state of the apparatus in the standby mode is a state where power is supplied to an apparatus for which warm-up is completed and the apparatus can execute processing but the apparatus is not executing the processing. For example, power consumption in the standby mode is smaller than power consumption in the operating mode. Of course, depending on the state of the apparatus in the operating mode, the power consumption in the operating mode may be the same as the power consumption in the standby mode, or may be smaller than the power consumption in the standby mode.

The state of the apparatus in the power saving mode is a state where power is not supplied to some parts constituting the apparatus or a state where power lower than power in the standby mode is supplied to some or all the parts constituting the apparatus.

In the following description, a time from the state of the apparatus to the state of the standby mode to the state of the power saving mode is referred to as a "transition time".

In a case where the mode of the apparatus is the standby mode and the transition time elapses from a point in time at which the apparatus performs processing last or a point in time at which the apparatus is last operated by a user, the mode of the apparatus transitions to the power saving mode. That is, in a case where the transition time elapses from the point in time at which the apparatus executes processing last or the point in time at which the apparatus is operated last, the mode of the apparatus transitions from the standby mode to the power saving mode.

In a case where the mode of the apparatus is the standby mode and the user gives an instruction about the execution of power saving (for example, in a case where the user presses a power saving button installed on the apparatus), the mode of the apparatus may transition from the standby mode to the power saving mode.

In a case where the mode of the apparatus is the power saving mode and a specific event occurs, the mode of the apparatus returns to the standby mode or the operating mode. The mode of the apparatus returns to the standby mode or the operating mode, and thus, the apparatus can execute processing. The specific event is an event corresponding to an instruction about returning. For example, in a case where a return button is provided in the apparatus and the user presses the return button, the mode of the apparatus returns from the power saving mode to the standby mode or the operating mode. In a case where the apparatus receives an instruction about the execution of processing, the mode of the apparatus may return from the power saving mode to the standby mode or the operating mode. The mode of the apparatus may return from the power saving mode to the standby mode, or may return from the power saving mode to the operating mode. For example, in a case where the mode of the apparatus is the power saving mode and the apparatus receives the instruction about the execution of processing, the mode of the apparatus may transition from the power saving mode to the operating mode in which the processing is executed.

It takes a time (hereinafter, referred to as a "return time") for the mode of the apparatus to return from the power saving mode to the standby mode or the operating mode. The return time is a time required for a state of each part constituting the apparatus to change from the power saving state to a state where processing and functions can be executed. Since the function, performance, characteristics, or the like are different for each part constituting the apparatus, the return time may be different for each part.

In the following description, the exemplary embodiment will be described by taking an image forming apparatus as an example of the apparatus, but the image forming apparatus is merely an example of the apparatus, and the exemplary embodiment may be applied to an apparatus other than the image forming apparatus.

A hardware configuration of an image forming apparatus 10 according to the exemplary embodiment will be described with reference to FIG. 1. FIG. 1 is a block diagram showing the hardware configuration of the image forming apparatus 10.

The image forming apparatus 10 includes an image forming unit 12, a UI 14, a communication device 16, a memory 18, and a processor 20. The image forming apparatus 10 is a printer, a scanner, a copier, a facsimile, or a multifunction apparatus (for example, an apparatus having functions of a plurality of apparatuses such as a printer, a scanner, and a copier).

The image forming unit 12 has at least one function of a print function, a scan function, a copy function, or a facsimile function. A printing method, scanning method, and the like are not particularly limited. For example, as a printing method, an electrophotographic method, an inkjet method, a thermal method, a thermal transfer method, or the like is used.

The UI 14 is a user interface and includes a display and an input device. The display is a liquid crystal display, an EL display, or the like. The input device is a keyboard, a mouse, an input key, an operation panel, or the like. The UI 14 may be a UI such as a touch panel having both a display and an input device.

The communication device 16 includes one or a plurality of communication interfaces having a communication chip, a communication circuit, and the like, and has a function of transmitting information to another apparatus and a function of receiving information from the other apparatus. The communication device 16 may have a wireless communication function such as short-range wireless communication or Wi-Fi (registered trademark), or may have a wired communication function.

The memory 18 is a device constituting one or a plurality of storage regions for storing data. The memory 18 is, for example, a hard disk drive (HDD), a solid state drive (SSD), various memories (for example, RAM, DRAM, NVRAM, ROM, and the like), other storage devices (for example, an optical disk or the like), or a combination thereof.

The processor 20 controls an operation of each part of the image forming apparatus 10.

For example, in a case where the power saving state of the image forming apparatus 10 is changed from a default first setting to another second setting, the processor 20 changes a power saving setting of the image forming apparatus 10 from the second setting to another third setting based on a usage status of the image forming apparatus 10. An example of the first setting, the second setting, and the third setting are settings of the transition time.

The third setting is a setting in which a power saving effect higher than in the second setting is obtained or a setting that is more convenient than in the second setting.

The setting in which the power saving effect higher than in the second setting is obtained is a setting in which a transition time during which the mode of the image forming apparatus 10 transitions from the standby mode to the power saving mode is shorter than a transition time in the second setting. As the transition time becomes short, the mode transitions from the standby mode to the power saving mode at an earlier stage. Thus, a higher energy saving effect can be expected.

The setting that is more convenient than in the second setting is a setting in which a transition time during which the mode of the image forming apparatus 10 transitions from the standby mode to the power saving mode is longer than a transition time in the second setting. As the transition time becomes long, the mode transitions from the standby mode to the power saving mode at a later stage. Thus, deterioration in the convenience of the image forming apparatus 10 may be suppressed. That is, as the transition time becomes long, the return from the standby mode becomes fast until the mode reaches the operating mode. Thus, the deterioration in the convenience may be suppressed.

For example, a first transition time during is the default first setting is set in advance in the image forming apparatus

10. In a case where the transition time set in the image forming apparatus 10 is not changed from the first transition time and the first transition time elapses from the point in time at which the apparatus executes processing last or the point in time at which the apparatus is operated last, the processor 20 changes the state of the image forming apparatus 10 from the operating state to the power saving state.

In a case where the transition time set in the image forming apparatus 10 is changed from the first transition time to a second transition time which is the second setting and the second transition time elapses from the point in time at which the apparatus executes processing last or the point in time at which the apparatus is operated last, the processor 20 changes the state of the image forming apparatus 10 from the operating state to the power saving state.

In a case where the transition time set in the image forming apparatus 10 is changed from the default first transition time to the second transition time, the processor 20 changes the power saving setting of the image forming apparatus 10 to a third transition time during which the power saving effect is higher than in the second transition time or a third transition time that is more convenient than in the second transition time based on the usage status of the image forming apparatus 10. The third transition time is an example of the third setting.

Here, a specific example of the mode of the image forming apparatus 10 will be described. As described above, the mode of the image forming apparatus 10 include the "operating mode", the "standby mode", and the "power saving mode".

The operating mode includes a warm-up mode and a processing execution mode. The warm-up mode is a mode in which the image forming apparatus 10 is powered on and processing by the image forming apparatus 10 can be executed. The processing execution mode is a mode in which the image forming apparatus 10 executes processing. The processing is printing, scanning, copying, or the like. As an example of the processing execution mode, there are a print mode, a scan mode, and the like. The print mode is a mode in which the image forming apparatus 10 executes printing. The scan mode is a mode in which the image forming apparatus 10 executes scanning.

A state of the image forming apparatus 10 in the standby mode is a state where power is supplied to the image forming apparatus 10 for which warm-up is completed and the image forming apparatus 10 can execute processing such as a print job, but the image forming apparatus 10 is not executing the processing.

A state of the image forming apparatus 10 in the power saving mode is a state where power is not supplied to some parts of the image forming apparatus 10 or a state where power lower than power in the standby mode is supplied to some or all the parts of the image forming apparatus 10.

The time during which the mode transitions from the standby mode to the power saving mode (that is, the transition time) is set in the image forming apparatus 10. A set value of the transition time is stored in the memory 18. In a case where the mode of the image forming apparatus 10 is the standby mode and a time during which the image forming apparatus 10 does not perform processing such as a print job or a time during which the UI 14 is not operated by the user is equal to or greater than the transition time, the processor 20 changes the mode of the image forming apparatus 10 from the standby mode to the power saving mode. That is, in a case where the transition time elapses from the point in time at which the apparatus executes processing last or the point in time at which the apparatus is operated last, the processor 20 changes the mode of the image forming apparatus 10 from the standby mode to the power saving mode.

In a case where the mode of the image forming apparatus 10 is the standby mode and the user operates the UI 14 to give the instruction about the execution of power saving (for example, in a case where the user presses the power saving button), the processor 20 may change the mode of the image forming apparatus 10 to the standby mode to the power saving mode.

In a case where the mode of the image forming apparatus 10 is the power saving mode and a specific event occurs, the processor 20 returns each part of the image forming apparatus 10 from the power saving mode to the standby mode. A state where the mode returns to the standby mode is a state where each part constituting the image forming apparatus 10 can execute processing or a function such as a print job. The state where the mode returns to the standby mode means that the state of each part constituting the image forming apparatus 10 transitions from the state in the power saving mode to the state where processing and functions can be executed. The specific event is an event corresponding to the instruction about returning. For example, in a case where the return button is provided on the operation panel and the user presses the return button, the processor 20 determines that the specific event occurs and changes the mode of the image forming apparatus 10 from the power saving mode to the standby mode. In a case where the part constituting the image forming apparatus 10 is powered off in the power saving mode, the part is powered on by the processor 20. In a case where the power supplied to the part is lower than the power in the standby mode, the processor 20 supplies the power in the standby mode to the part. In a case where the print job is transmitted from an external apparatus to the image forming apparatus 10 and the processor 20 accepts the print job, the processor 20 determines that the specific event occurs and changes the mode of the image forming apparatus 10 from the power saving mode to the standby mode. In this case, the processor 20 may change the mode of the image forming apparatus 10 from the power saving mode to the processing execution mode (for example, the print mode). The specific event described herein is merely an example of the event that causes the return, and other events may be set as the event that causes the return.

The processor 20 may stepwisely change the power saving setting of the image forming apparatus 10 based on the usage status of the image forming apparatus 10. For example, the stepwise setting includes a first-stage setting and a second-stage setting. The first-stage setting and the second-stage setting are settings for different setting items. For example, the second-stage setting is a setting in which a power saving effect higher than in the first-stage setting is obtained.

For example, a plurality of different modes are set as the power saving mode. Here, as an example, a first power saving mode and a second power saving mode are set. The second power saving mode is a mode in which power consumption is less than in the first power saving mode. That is, the second power saving mode is a mode in which a power saving effect higher than in the first power saving mode is obtained. The power saving mode realized by the first-stage setting is the first power saving mode. The power saving mode realized by the second-stage setting is the second power saving mode. A state of the image forming apparatus 10 in the first power saving mode corresponds to an example of a first power saving state. A state of the image forming apparatus 10 in the second power saving mode corresponds to an example of a second power saving state.

In a case where a plurality of different modes are set as the power saving mode, the transition time is set for each power saving mode. For example, a transition time A which is a transition from the standby mode to the first power saving mode and a transition time B which is a transition from the first power saving mode to the second power saving mode are set.

The processor 20 changes a length of the transition time A during which the mode transitions from the standby mode to the first power saving mode in the first-stage setting, and changes the transition time B during which the mode transitions from the first power saving mode to the second power saving mode in the second-stage setting.

For example, the first power saving mode and the second power saving mode are set in consideration of a power saving effect and the return time. The return time is a time required for each part of the image forming apparatus 10 to return from the power saving mode to the standby mode. That is, the return time is a time required for the state of each part constituting the image forming apparatus 10 to change from the state in the power saving mode to the state where processing and functions can be executed. The return time may be different for each part constituting the image forming apparatus 10. For example, a return time of a part, such as an operation panel that functions immediately in a case where power is supplied is relatively short. On the other hand, a return time of a part such as a fixing device that functions after a certain amount of time elapses since the supply of the power is stated is relatively long. In a case where the fixing device is described as an example, since it is necessary to raise a temperature of the fixing device to a target temperature required for fixing, the transition time becomes long by time required for the temperature rise. In general, in a case where the fixing device is powered off once, it takes a long time until actual printing can be performed from the state where the fixing device is powered off.

The return time corresponds to a time while the user is waiting for the state of the image forming apparatus 10 to transition from the power saving mode to the standby mode. Thus, the return time can be expressed as a standby time for the user.

In a case where the plurality of different modes are set as the power saving mode, each of the above-mentioned first setting, second setting, and third setting includes the transition time A during which the mode transitions from the standby mode to the first power saving mode and the transition time B during which the mode transitions from the first setting from the first power saving mode. That is, each of the first transition time included in the first setting, the second transition time included in the second setting, and the third transition time included in the third setting includes the transition times A and B.

In a case where the mode of the image forming apparatus 10 is the standby mode and a time during which the processing is not performed by the image forming apparatus 10 or a time during which the UI 14 is not operated by the user is equal to or greater than the transition time A, the processor 20 changes the mode of the image forming apparatus 10 from the standby mode to the first power saving mode. That is, in a case where the transition time A elapses from the point in time at which the apparatus performs processing last or is operated last, the processor 20 changes the mode of the image forming apparatus 10 from the standby mode to the first power saving mode. In a case where the mode of the image forming apparatus 10 is the first power saving mode and the specific event causing the return occurs, the processor 20 changes the mode of the image forming apparatus 10 from the first power saving mode to the standby mode.

In a case where the mode of the image forming apparatus 10 is the first power saving mode and the time during which the image forming apparatus 10 does not perform processing or the time during which the UI 14 is not operated by the user is equal to or greater than the transition time B, the processor 20 changes the mode of the image forming apparatus 10 from the first power saving mode to the second power saving mode. That is, in a case where the transition time B elapses without any processing or operation from a point in time at which the mode transitions to the first power saving mode, the processor 20 changes the mode of the image forming apparatus 10 from the first power saving mode to the second power saving mode. In a case where the mode of the image forming apparatus 10 is the second power saving mode and the specific event causing the return occurs, the processor 20 changes the mode of the image forming apparatus 10 from the second power saving mode to the standby mode.

The first power saving mode and the second power saving mode are merely examples, and three or more different power saving modes may be set and the power saving modes may be stepwisely changed.

Figure 2:
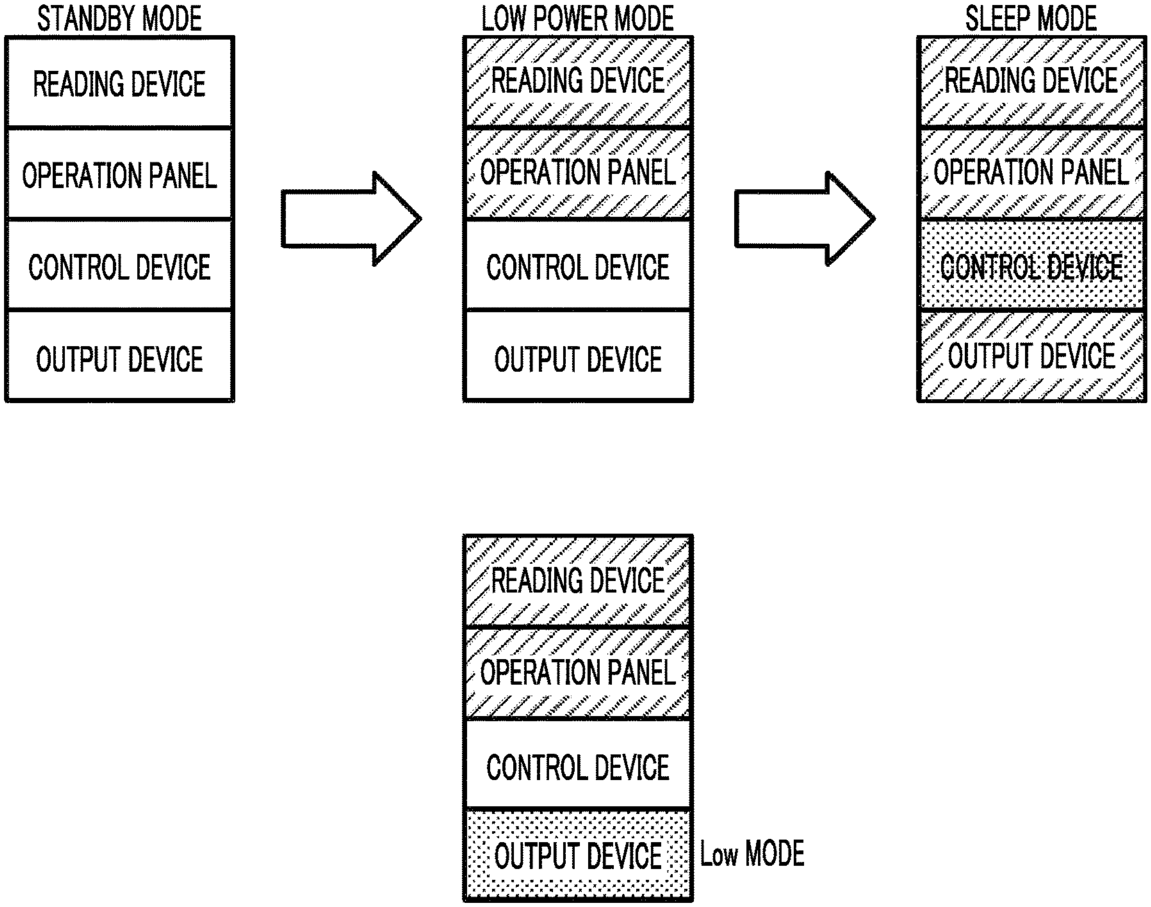
FIG. 2 is a diagram showing each mode of the image forming apparatus.

Hereinafter, the standby mode, a low power mode, and a sleep mode will be described with reference to FIG. 2. In the following description, the low power mode may be referred to as an "LP mode" and the sleep mode may be referred to as an "SP mode". As described above, the standby mode is a mode in which power is supplied to each part of the image forming apparatus 10. The low power mode and the sleep mode are examples of the power saving mode. The low power mode is an example of the first power saving mode, and the sleep mode is an example of the second power saving mode. The sleep mode is a mode in which power consumption is less than in the low power mode. That is, the sleep mode is a mode in which a power saving effect higher than in the low power mode is obtained.

In the following description, each mode will be described as an example, focusing on the supply of power to each of a reading device, an operation panel, a control device, and an output device.

The reading device is a device included in the image forming unit 12, and is a device that generates image data by optically reading information on a document. The operation panel is a device included in the UI 14, and displays an image or accepts an instruction or the like from the user. The control device includes the memory 18 and the processor 20 and controls the image forming apparatus 10. The output device is a device included in the image forming unit 12 and is a device that executes a print function. For example, the output device includes a device that forms a toner image by exposure and development, a transfer device for transferring the toner image to the paper, and a fixing device for fixing the toner image transferred to the paper to the paper.

In the standby mode, power is supplied to each part of the image forming apparatus 10. Specifically, power is supplied to the reading device, the operation panel, the control device, and the output device, and the state of the image forming apparatus 10 is a state where processing such as a print job can be executed.

In the low power mode, the reading device and the operation panel are in the power saving state. Specifically, the reading device and the operation panel are powered off, and power is not supplied to the reading device and the operation panel. For example, in a case where the operation panel has a backlight, that backlight is turned off.

A Low mode as the low power mode may be executed. The Low mode is a mode in which power for maintaining a temperature of the fixing device within a predetermined temperature range is supplied to the output device without powering off the output device. The predetermined temperature range is a temperature range lower than the temperature of the fixing device during printing (that is, a target temperature required for fixing), and is a range of a temperature higher than the temperature of the fixing device before the fixing device is heated in a state where the fixing device is powered off. The predetermined temperature range may be a constant temperature. The temperature of the fixing device is lowered to a temperature lower than the target temperature required for fixing, and thus, the power consumption of the fixing device is reduced. The time required to return to the standby mode is shorter than in a case where the fixing device is powered off. As described above, in the Low mode, both the reduction in the power consumption of the fixing device and the reduction in the return time of the fixing device are realized.

In the sleep mode, the reading device, the operation panel, and the output device are in a power saving state. Specifically, the reading device, the operation panel, and the output device are powered off, and power is not supplied to the reading device, the operation panel, and the output device.

In the sleep mode, the control device is in the power saving state. For example, a state where a clock of the processor 20 included in the control device is turned off, a state where the supply of power to the processor 20 is stopped, or a state where the supply of power to parts other than the memory 18 included in the control device is stopped is an example of the power saving state of the control device. These states are merely examples of the sleep mode, and in a case where the power consumption in the sleep mode is lower than the power consumption in the low power mode, another power control may be performed.

The transition time is set for each power saving mode. For example, the transition time A which is the time during which the mode transitions from the standby mode to the low power mode, and the transition time B which is the time during which the mode transitions from the low power mode to the sleep mode are set. A value of the transition time A and a value of the transition time B are stored in the memory 18.

In the following description, the transition time A during which the mode transitions from the standby mode to the low power mode is referred to as an "LP transition time", and the transition time B during which the mode transitions from the low power mode to the sleep mode is referred to as an "SLP transition time".

In a case where the mode of the image forming apparatus 10 is the standby mode and the time during which the processing is not performed by the image forming apparatus 10 or the time during which the UI 14 is not operated by the user is equal to or greater than the LP transition time, the processor 20 changes the mode of the image forming apparatus 10 from the standby mode to the low power mode. That is, in a case where the LP transition time elapses since the point in time at which the apparatus performs processing last or is operated last, the processor 20 changes the mode of the image forming apparatus 10 from the standby mode to the low power mode.

In a case where the mode of the image forming apparatus 10 is the low power mode and the specific event causing the return occurs, the processor 20 changes the mode of the image forming apparatus 10 from the low power mode to the standby mode.

In a case where the mode of the image forming apparatus 10 is the low power mode and the time during which the processing is not performed by the image forming apparatus 10 or the time during which the UI 14 is not operated by the user is equal to or greater than the SLP transition time, the processor 20 changes the mode of the image forming apparatus 10 from the low power mode to the sleep mode. That is, in a case where the SLP transition time elapses without any processing or operation from a point in time at which the mode transitions to the first power saving mode, the processor 20 changes the mode of the image forming apparatus 10 from the low power mode to the sleep mode.

In a case where the mode of the image forming apparatus 10 is the sleep mode and the specific event causing the return occurs, the processor 20 changes the mode of the image forming apparatus 10 from the sleep mode to the standby mode.

The return time required to return from the power saving mode to the standby mode is different depending on the power saving mode. Specifically, the return time required to return from the sleep mode to the standby mode is longer than the return time required to return from the low power mode to the standby mode.

Figure 3:
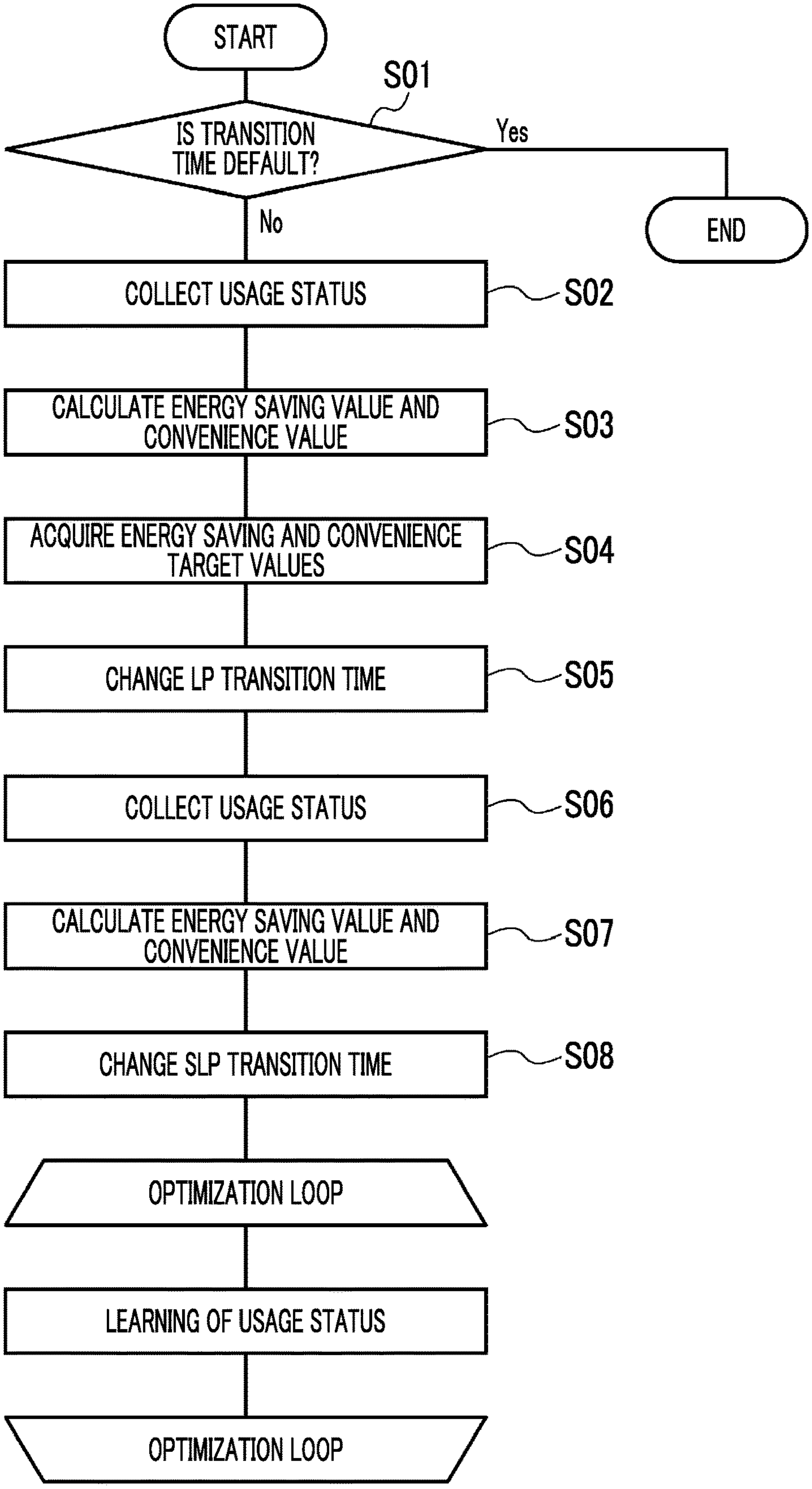
FIG. 3 is a flowchart showing a flow of processing of changing a power saving setting.

Hereinafter, processing of changing the power saving setting will be described with reference to FIG. 3. FIG. 3 shows a flowchart showing a flow of the processing of changing the power saving setting.

In the following description, it is assumed that the low power mode and the sleep mode are set as the power saving mode, and the LP transition time and the SLP transition time are set as the transition time.

A transition time of the first setting is referred to as a "transition time 1". An LP transition time and the SLP transition time included in the transition time 1 are referred to as "LP1" and "SLP1", respectively.

A transition time of the second setting is referred to as a "transition time 2". An LP transition time and an SLP transition time included in the transition time 2 are referred to as "LP2" and "SLP2", respectively.

There are a plurality of different settings as the third setting. Here, as an example, there are two different settings as the third setting. One setting is referred to as a "third setting A" and the other setting is referred to as a "third setting B".

A transition time of the third setting A is referred to as a "transition time 3A". An LP transition time and an SLP transition time included in the transition time 3A are referred to as "LP3" and "SLP2", respectively.

A transition time of the third setting B is referred to as a "transition time 3B". An LP transition time and an SLP transition time included in the transition time 3B are referred to as "LP3" and "SLP3", respectively.

First, the processor 20 determines whether or not the transition time set in the image forming apparatus 10 is the default transition time (S01). The default transition time setting corresponds to an example of the first setting. In step S01, the processor 20 determines whether or not the power saving setting of the image forming apparatus 10 is changed from the first setting which is the default setting to another second setting.

In a case where the power saving setting of the image forming apparatus 10 is the default first setting (S01, Yes), the processor ends the processing. In this case, the processor 20 controls the power saving of the image forming apparatus 10 according to the first setting (LP1, SLP1). The processing is executed from step S01.

In a case where the power saving setting of the image forming apparatus 10 is not the default first setting (S01, No), the processor 20 collects the usage status of the image forming apparatus 10 over a predetermined period (S02). For example, in a case where the power saving setting is changed from the first setting (LP1, SLP1) to the second setting (LP2, SLP2), the processor 20 collects the usage status of the image forming apparatus 10 over a predetermined period from a point in time at which the power saving setting is changed from the first setting to the second setting.

The usage status of the image forming apparatus 10 is a history of usage of the image forming apparatus 10, and information indicating the usage status is stored in the memory 18. Specifically, the usage status of the image forming apparatus 10 includes an operation time of each mode in the above period and the number of times the image forming apparatus 10 returns from the power saving mode to the standby mode in the above period (hereinafter, referred to as the "number of times of returning"), and the amount of power consumed in each mode during the above period.

The operation time of the mode is a length of a time during which the state of the image forming apparatus 10 is in the state in the mode during the above period. The operation time for each mode is used. For example, an operation time of the warm-up mode is a time during which the image forming apparatus 10 is warmed up during the above period. An operation time of the standby mode is a time during which the mode of the image forming apparatus 10 is the standby mode during the above period. The same applies to the other modes.

The number of times of returning for each power saving mode is used. Specifically, the number of times the image forming apparatus 10 returns from the low power mode to the standby mode during the above period (that is, the number of times of returning from the low power mode) and the number of times the image forming apparatus 10 returns from the sleep mode to the standby mode during the above period (that is, the number of times of returning from the sleep mode) are used. In a case where the mode of the image forming apparatus 10 is the standby mode, it is assumed that the number of times the image forming apparatus 10 executes processing is defined as the number of times of returning from the standby mode, and the number of times of returning from the standby mode is also included in the number of times of returning as the usage status.

The second setting may be a setting in which both the LP transition time and the SLP transition time are changed from the first setting or a setting in which either the LP transition time or the SLP transition time is changed. That is, the setting (LP1, SLP2) or the setting (LP2, SLP1) may be the second setting.

The processor 20 calculates an energy saving value and a convenience value of the image forming apparatus 10 based on the usage status of the image forming apparatus 10 collected in step S02 (S03).

The energy saving value is a value related to the power consumption of the image forming apparatus 10. Specifically, the processor 20 calculates the amount of power of the mode during the above period based on a power value consumed in the mode and the operation time of the mode for each mode, and calculates the total amount of power of all the modes during the period. The total amount is a value of energy saving during the above period.

The convenience value is a value related to the return time (that is, a standby time for the user). Specifically, the processor 20 calculates an average value of the return time (that is, an average value of the standby time) based on the number of times of returning and the return time during the above period. The average value is a convenience value during the above period.

As the number of times of returning, the number of times of returning from the standby mode, the number of times of returning from the low power mode, and the number of times of returning from the sleep mode are used.

The return time used to calculate the average value of the return time is different for each mode. The return time for each mode is determined in advance. As the return time, the return time from the standby mode, the return time from the low power mode, and the return time from the sleep mode are used. In a case where the mode of the image forming apparatus 10 is the standby mode, since the mode of the image forming apparatus 10 already returns to the standby mode, the return time of the standby mode cannot be considered, and the value is "0". Here, the return time of the standby mode is used to calculate the average value of the return time.

The processor 20 acquires energy saving and convenience target values (S04). The energy saving target value is a target value of the amount of power consumption. The convenience target value is a target value of the return time (that is, the standby time). Either the energy saving target value or the convenience target value may be used, or a target value obtained by combining the energy saving target value and the convenience target value may be used.

The target value is designated by the user. For example, in a case where the user operates the UI 14, the target value is input to the image forming apparatus 10 and is stored in the memory 18. A timing at which the target value is input to the image forming apparatus 10 is not particularly limited. The target value may be input to the image forming apparatus 10 at the time of an initial setting of the image forming apparatus 10 or after the image forming apparatus 10 is used for a certain period. The processor 20 acquires the target value stored in the memory 18.

The processor 20 calculates the LP transition time based on the value calculated in step S03 (that is, the energy saving value and the convenience value), calculates the LP transition time based on the target value acquired in step S04, and changes the LP transition time in the second setting (LP2, SLP2) to the calculated LP transition time (S05). The changed setting is the third setting A (LP3, SLP2). That is, the processor 20 changes the LP transition time without changing the SLP transition time from the second setting.

Specifically, the processor 20 compares the value calculated in step S03 with the target value, and calculates the LP transition time (LP3) of the third setting A based on the comparison result.

Here, a relationship between the transition time, the energy saving, and the convenience will be described.

As the LP transition time becomes short, the mode transitions from the standby mode to the low power mode at an earlier stage. Since the power consumption in the low power mode is lower than the power consumption in the standby mode, a higher energy saving effect can be expected by causing the mode to transition from the standby mode to the low power mode at an earlier stage. On the other hand, focusing on the return time, the return time from the low power mode is longer than the return time from the standby mode (actually, the return time cannot be considered). Therefore, in a case where the mode transitions from the standby mode to the low power mode at an earlier stage, the return time is longer and the convenience of the user is reduced.

On the contrary, as the LP transition time becomes long, the mode transitions from the standby mode to the low power mode at a later stage. Thus, the convenience of the user is improved, but the energy saving effect is reduced.

As described above, it can be said that there is a trade-off relationship between the energy saving and the convenience in terms of the transition time. The processor 20 changes the transition time so as to improve the energy saving, or changes the transition time in order to improve the convenience, based on the relationship between the energy saving value and the convenience value and the target values.

For example, focusing on the convenience, in a case where the return time calculated in step S03 (that is, the actual return time) is shorter than the return time target value, the processor 20 sets the LP transition time (LP3) of the third setting A to be shorter than the LP transition time (LP2) of the second setting. In a case where the actual return time is shorter than a target return time (that is, the return time indicated by the target value), it is presumed that the user considers as not being dissatisfied with the convenience. In other words, it is presumed that the user considers that the return time is not inconvenient. Therefore, even though the power saving setting is changed to a setting in which an energy saving effect higher than in the second setting is obtained, it is presumed that the convenience of the user does not decrease. As the LP transition time becomes short, the mode transitions from the standby mode to the low power mode at an earlier stage. Thus, a higher energy saving effect is obtained. Therefore, in a case where the actual return time is shorter than the target return time, the processor 20 sets the LP transition time (LP3) of the third setting A to be shorter than the LP transition time (LP2) of the second setting. The amount to be shortened may be determined in advance, may be designated by the user, or may be a value corresponding to a difference between the actual return time and the target value.

On the other hand, in a case where the actual return time is longer than the target return time, the processor 20 sets the LP transition time (LP3) of the third setting A to be longer than the LP transition time (LP2) of the second setting. In a case where the actual return time is longer than the target return time, it is presumed that the user is dissatisfied with the convenience and demands the convenience. Therefore, in order to improve the convenience, the processor 20 sets LP3 to be longer than LP2. As the LP transition time becomes long, the mode transitions from the standby mode to the low power mode at a later stage. Thus, the convenience is improved. The amount to be lengthened may be predetermined, may be designated by the user, or may be a value corresponding to a difference between the actual return time and the target value.

Focusing on the energy saving, in a case where the total amount of power of all the modes calculated in step S03 (that is, the actual total amount of power) is smaller than the target value of the amount of power consumption, the processor 20 sets LP3 of the third setting A to be longer than the LP2 of the second setting. In a case where the actual total amount of power is less than the target amount of power (that is, the amount of power indicated by the target value), it is presumed that the user is not dissatisfied with the energy saving. Therefore, even though the power saving setting is changed to a setting in which an energy saving effect lower than in the second setting is obtained, it is presumed that the energy saving effect required by the user is obtained. As the LP transition time becomes long, the mode transitions from the standby mode to the low power mode at a later stage. Thus, the energy saving effect is reduced. On the other hand, the convenience is improved. With this in mind, in a case where the actual total amount of power is less than the target amount of power, the processor 20 sets LP3 to be longer than LP2. The amount to be lengthened may be predetermined, may be designated by the user, or may be a value corresponding to a difference between the actual total amount of power and the target value.

On the other hand, in a case where the actual total amount of power is larger than the target amount of power, the processor 20 sets LP3 to be shorter than LP2. In a case where the actual total amount of power is larger than the target amount of power, it is presumed that the user is dissatisfied with the energy saving and demands the energy saving. Therefore, in order to improve the energy saving, the processor 20 sets LP3 to be shorter than LP2. As the LP transition time is shortened, the mode shifts from the standby mode to the low power mode at an earlier stage. Thus, the energy saving is improved. The amount to be shortened may be predetermined, may be designated by the user, or may be a value corresponding to a difference between the actual total amount of power and the target value.

The processor 20 may use, as LP3 of the third setting A, the LP transition time calculated by (1) the comparison result between an actual convenience value (that is, an actual return time) and the convenience target value (that is, the return time target value), and may use, as LP3 of the third setting A, the LP transition time calculated by (2) the comparison result between an actual energy saving value (that is, the actual total amount of power) and the energy saving target value (that is, a target value of the amount of power). That is, the processor 20 may calculate either the LP transition time of (1) or the LP transition time of (2), and may use the calculated LP transition time as LP3 of the third setting A.

The processor 20 may use, as LP3 of the third setting A, (3) the LP transition times calculated by the comparison results of (1) and (2). For example, in a case where the comparison results of both (1) and (2) are to lengthen the LP transition time, the processor 20 sets LP3 to be longer than LP2. In a case where the comparison results of both (1) and (2) are to shorten the LP transition time, the processor 20 sets LP3 to be shorter than LP2. In a case where the comparison result of (1) and the comparison result of (2) conflict with each other, the processor 20 sets LP3 of the third setting A by adopting either the comparison result of (1) or the comparison result of (2). For example, the user selects either the comparison result of (1) or the comparison result of (2), and the processor 20 sets LP3 of the third setting A according to the selection of the user. The processor 20 may set LP3 of the third setting A by adopting a preset comparison result of the comparison result of (1) and the comparison result of (2).

In a case where the LP3 is calculated, the processor 20 controls the power saving of the image forming apparatus 10 according to the third setting A (LP3, SLP2). That is, in a case where the LP transition time indicated by LP3 elapses from the point in time at which the apparatus executes processing last or the point in time at which the apparatus is operated last, the processor 20 changes the mode of the image forming apparatus 10 from the standby mode to the low power mode.

In a case where the power saving setting is changed to the third setting A (LP3, SLP2), the processor 20 collects the usage status of the image forming apparatus 10 over a predetermined period from a point in time at which the power saving setting is changed from the second setting to the third setting A (S06). This period may be a period having the same length as the period of step S02, or may be a period having a different length.

Subsequently, the processor 20 calculates the energy saving value and the convenience value of the image forming apparatus 10 based on the usage status of the image forming apparatus 10 collected in step S06 as in step S03 (S07).

Subsequently, the processor 20 calculates the SLP transition time based on the value calculated in step S07 (that is, the energy saving value and the convenience value) and the target value acquired in step S04, and changes the SLP transition time in the third setting A (LP3, SLP2) to the calculated SLP transition time (S08). The changed setting is the third setting B (LP3, SLP3). That is, the processor 20 changes the SLP transition time without changing the LP transition time from the third setting A.

A method for changing the SLP transition time is the same as the method for changing the LP transition time. That is, the processor 20 compares the value calculated in step S07 with the target value, and calculates the SLP transition time (SLP3) of the third setting B based on the comparison result.

Focusing on the convenience, in a case where the return time calculated in step S07 (that is, the actual return time) is shorter than the return time target value, the processor 20 sets the SLP transition time (SLP3) of the third setting B to be shorter than the SLP transition times (SLP2) of the second setting and the third setting A. In a case where the actual return time is shorter than a target return time (that is, the return time indicated by the target value), it is presumed that the user considers as not being dissatisfied with the convenience. In other words, it is presumed that the user considers that the return time is not inconvenient. Therefore, even though the power saving setting is changed to a setting in which an energy saving effect higher than in the second setting and the third setting A is obtained, it is presumed that the convenience of the user does not decrease. As the SLP transition time is shortened, the mode transition to the sleep mode at an earlier stage. Thus, a higher energy saving effect is obtained. Therefore, in a case where the actual return time is shorter than the target return time, the processor 20 sets the SLP transition time (SLP3) of the third setting B to be shorter than the SLP transition times (SLP2) of the second setting and the third setting A. The amount to be shortened may be determined in advance, may be designated by the user, or may be a value corresponding to a difference between the actual return time and the target value.

On the other hand, in a case where the actual return time is longer than the target return time, the processor 20 sets the LP transition time (SLP3) of the third setting B to be longer than the SLP transition times (SLP2) of the second setting and the third setting A. In a case where the actual return time is longer than the target return time, it is presumed that the user is dissatisfied with the convenience and demands the convenience. Therefore, in order to improve the convenience, the processor 20 sets SLP3 to be longer than SLP2. As the SLP transition time becomes longer, the mode transitions to the sleep mode at a later stage. Thus, the convenience is improved. The amount to be lengthened may be predetermined, may be designated by the user, or may be a value corresponding to a difference between the actual return time and the target value.

Focusing on the energy saving, in a case where the total amount of power of all the modes calculated in step S07 (that is, the actual total amount of power) is smaller than the target value of the amount of power consumption, the processor 20 sets SLP3 of the third setting B to be longer than SLP2 of the second setting and the third setting A. In a case where the actual total amount of power is less than the target amount of power (that is, the amount of power indicated by the target value), it is presumed that the user is not dissatisfied with the energy saving. Therefore, even though the power saving setting is changed to a setting in which an energy saving effect lower than in the second setting and the third setting A is obtained, it is presumed that the energy saving effect required by the user is obtained. As the SLP transition time becomes long, the mode transitions to the sleep mode at a later stage. Thus, the energy saving effect is reduced. On the other hand, the convenience is improved. With this in mind, in a case where the actual total amount of power is less than the target amount of power, the processor 20 sets SLP3 to be longer than SLP2. The amount to be lengthened may be predetermined, may be designated by the user, or may be a value corresponding to a difference between the actual total amount of power and the target value.

On the other hand, in a case where the actual total amount of power is larger than the target amount of power, the processor 20 sets SLP3 to be shorter than SLP2. In a case where the actual total amount of power is larger than the target amount of power, it is presumed that the user is dissatisfied with the energy saving and demands the energy saving. Therefore, in order to improve the energy saving, the processor 20 sets SLP3 to be shorter than SLP2. As the SLP transition time becomes short, the mode transitions to the sleep mode at an earlier stage. Thus, the energy saving is improved. The amount to be shortened may be predetermined, may be designated by the user, or may be a value corresponding to a difference between the actual total amount of power and the target value.

The processor 20 may use, as SLP3 of the third setting B, the SLP transition time calculated by (4) the comparison result between the actual convenience value (that is, the actual return time) and the convenience target value (that is, the return time target value) , or may use, as SLP3 of the third setting B, the SLP transition time calculated by (5) the comparison result between the actual energy saving value (that is, the actual total amount of power and the energy saving target value (that is, the target value of the amount of power). That is, the processor 20 may calculate either the SLP transition time of (4) or the SLP transition time of (5), and may use, as SLP3 of the third setting B, the calculated SLP transition time.

The processor 20 may use, as SLP3 of the third setting B, the SLP transition time calculated from (6) the comparison results of (4) and (5). For example, in a case where the comparison results of both (4) and (5) are to increase the SLP transition time, the processor 20 sets SLP3 to be longer than SLP2. In a case where the comparison results of both (4) and (5) are to shorten the SLP transition time, the processor 20 sets SLP3 to be shorter than SLP2. In a case where the comparison result of (4) and the comparison result of (5) conflict with each other, the processor 20 sets SLP3 of the third setting B by adopting either the comparison result of (4) or the comparison result of (5). For example, the user selects either the comparison result of (4) or the comparison result of (5), and the processor 20 sets SLP3 of the third setting B according to the selection of the user. The processor 20 may set SLP3 of the third setting B by adopting a predetermined comparison result from the comparison result of (4) and the comparison result of (5).

In a case where the power saving setting is changed to the third setting B, the processor 20 controls the power saving of the image forming apparatus 10 according to the third setting B. That is, the processor 20 controls the transition to the low power mode according to LP3 as the LP transition time, and controls the transition to the sleep mode according to SLP3 as the SLP transition time.

An optimization loop may be executed after the power saving setting is changed to the third setting B. For example, the processor 20 learns the usage status of the image forming apparatus 10, and changes the LP transition time or the SLP transition time as described above based on the learning result. Artificial intelligence (AI) may be used to learn the usage status.

Whether or not to execute the processing shown in FIG. 3 may be set. For example, in a case where the setting for executing the processing is turned on in the image forming apparatus 10, the processor 20 executes the processing. In a case where the setting for executing the processing is turned off in the image forming apparatus 10, the processor 20 does not execute the processing. The turning-on or -off may be set in the image forming apparatus 10 in advance, or the user may select on the turning-on or -off.

In the above example, the LP transition time is changed in step S05 (for example, the first-stage setting), and then the SLP transition time is changed in step S08 (for example, the second-stage setting). As another example, the LP transition time may be changed or the SLP transition time may be changed in both steps S05 and S08. For example, the LP transition time may be changed to a certain value (for example, 30 minutes) in step S05, and the LP transition time may be changed to another value (for example, 10 minutes) in step S07. The same applies to the SLP transition time.

Hereinafter, a case where the power saving setting is changed from the first setting (LP1, SLP1) to the second setting (LP2, SLP2) will be described.

For example, the user may manually change the power saving setting from the first setting to the second setting. As another example, it is considered that the power saving setting of another image forming apparatus is used as the second setting of the image forming apparatus 10. For example, cloning is used. Cloning is to copy setting information of another image forming apparatus and transfer the setting information to the image forming apparatus 10, and set the same setting as the setting of the other image forming apparatus in the image forming apparatus 10. In this case, second setting information indicating the power saving setting (that is, the second setting) of the other image forming apparatus is sent from the other image forming apparatus to the image forming apparatus 10, and the power saving setting of the image forming apparatus 10 is changed from the first setting to the second setting. As described above, after the power saving setting is changed from the first setting to the second setting, the usage status of the image forming apparatus 10 is collected, and the power saving setting is changed from the second setting to the third setting based on the usage status. For example, in a case where another image forming apparatus is an old model and the image forming apparatus 10 is a new model, it is considered that the old model is replaced with the new model. In this case, the setting of the old model is set to the new model by cloning. The user may manually set the transition time of the old model to the new model.

In a case where it is presumed that a high energy saving effect in the new model is not obtained in the setting of the old model, the processor 20 may execute the processing of step S02 and subsequent steps. For example, in a case where the target value cannot be achieved by the setting of the old model, the processor 20 executes the processing of step S02 and subsequent steps.

A timing at which the power saving setting is changed from the first setting to the second setting is, for example, a timing at which a new image forming apparatus 10 is installed in a place such as an office or a timing at which the initial setting of the image forming apparatus 10 is performed are considered. In the initial settings, for example, a local area network (LAN) cable connection, a communication setting (for example, acquisition and setting of an IP address), a password setting, user registration, and the like are performed. For example, in a case where an image forming apparatus used in an office or the like is replaced with a new image forming apparatus 10 from another image forming apparatus, it is considered that the power saving setting is changed from the first setting to the second setting. The power saving setting may be changed from the first setting to the second setting from when the image forming apparatus 10 of the new model is first powered on to when the power is powered off. The change at this time also corresponds to an example of a change of the power saving in the initial setting.

In a case where the power saving setting is changed from the first setting to the second setting at the time of the initial setting of the image forming apparatus 10, after a predetermined time elapses at the time of the initial setting, the processor 20 changes the power saving setting from the second setting to the third setting based on the usage status of the image forming apparatus 10 after the initial setting is performed. The usage status of the image forming apparatus 10 after the initial setting is performed is, for example, a usage status of the image forming apparatus 10 during a predetermined period from the time of the initial setting.

The power saving setting may be changed from the first setting to the second setting after the image forming apparatus 10 is used over a predetermined period from the time of the initial setting. In this case, the processor 20 may change the power saving setting from the second setting to the third setting (for example, the third setting A) based on the usage status of the image forming apparatus 10 until the power saving setting is changed from the first setting to the second setting. That is, the processor 20 changes the power saving setting from the second setting to the third setting (for example, the third setting A) based on a usage status (that is, a past usage status) before a point in time at which the power saving setting is changed to the second setting. As described above, the usage status before the power saving setting is changed to the second setting may be used.

In a case where the power saving setting is changed from the second setting to the third setting A, the processor 20 may display information indicating that the power saving setting is changed from the second setting to the third setting A on the display of the UI 14. For example, the processor 20 displays a message such as "the power saving setting is changed from the second setting to the third setting A" or "the LP transition time is changed from LP2 to LP3" on the display of the UI 14. The processor 20 may generate voice corresponding to these messages from a speaker, and may transmit information indicating these messages to a terminal device of the user (for example, a personal computer (hereinafter, referred to as a "PC"), a tablet PC, a smartphone, a mobile phone, or the like. The processor 20 may display information indicating LP3 on the display, may generate voice expressing the information from the speaker, or may transmit the information to the terminal device.

Similarly, in a case where the power saving setting is changed from the third setting A to the third setting B, the processor 20 may display the information indicating that the power saving setting is changed from the third setting A to the third setting B on the display of the UI 14. For example, the processor 20 displays a message such as "the power saving setting is changed from the third setting A to the third setting B" or a message such as "the SLP transition time is changed from SLP2 to SLP3" on the display of the UI 14. The processor 20 may generate the voice corresponding to these messages from the speaker, or may transmit the information indicating these messages to the terminal device of the user. The processor 20 may display information indicating SLP3 on the display, may generate voice expressing the information from the speaker, or may transmit the information to the terminal device.

The processor 20 may display information indicating that the power saving setting is changed from the second setting to the third setting A on a login screen first displayed after the power saving setting is changed from the second setting to the third setting A. The login screen is a screen for inputting authentication information (for example, a user ID and a password) necessary for the user to log in to the image forming apparatus 10. The login screen is displayed on the display of the UI 14. In a case where the authentication information is input on the login screen and the authentication succeeds, the user is permitted to log in to the image forming apparatus 10. The functions and processing allowed to be used by the user are different between before and after login. For example, the user logs in to the image forming apparatus 10, the image forming apparatus 10 executes processing, and then the user logs out from the image forming apparatus 10. Thereafter, in a case where the power saving setting is changed from the second setting to the third setting A, the processor 20 displays information indicating that the power saving setting is changed from the second setting to the third setting A on the login screen displayed after the log-out. The information indicating SLP3 may be displayed on the login screen.

The same applies a case where the power saving setting is changed from the third setting A to the third setting B. The processor 20 displays the information indicating that the power saving setting is changed from the third setting A to the third setting B on the login screen first displayed after the power saving setting is changed from the third setting A to the third setting B.

Hereinafter, a specific example in which the power saving setting is changed based on the usage status of the image forming apparatus 10 in a case where the power saving setting of the image forming apparatus 10 is changed from the default first setting to the second setting will be described.

Figures 4, 5:
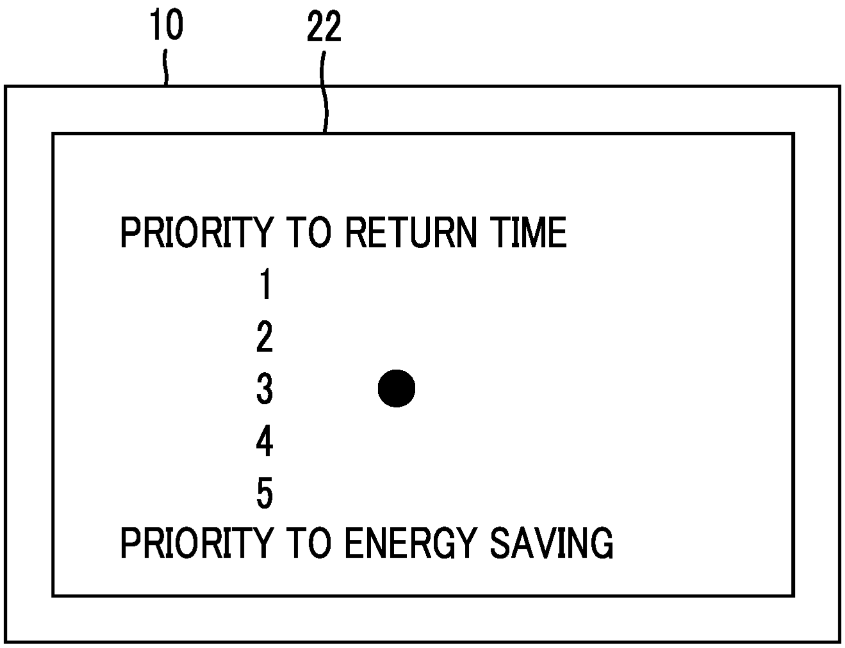
FIG. 4 is a diagram showing a screen for setting a target level.
FIG. 5 is a diagram showing a relationship between the amount of power consumption and a return time for each target level.

FIG. 4 shows a screen 22 for setting a target level. The target level is a value corresponding to the energy saving and convenience target values. In the example shown in FIG. 4, the target level can be designated within a range of 1 to 5. Level 1 is a level that gives a priority to the return time, that is, a level that gives a priority to the convenience. Level 5 is a level that gives a priority to the energy saving. The user designates a level that the user wants from the levels 1 to 5 on the screen 22. In the example shown in FIG. 4, the level 3 is designated.

FIG. 5 shows the power consumption and the average return time for each target level. The amount of power consumption is the energy saving target value, and the average return time is the convenience target value. The average return time shown in FIG. 5 is the average return time of the operation panel constituting the UI 14.

The energy saving target value corresponding to the level 3 is 5000 [Wh], and the convenience target value corresponding to the level 3 (that is, the target value of the average return time of the operation panel) is 1.5 [seconds]. In step S05 described above, the processor 20 calculates the LP transition time by comparing the value calculated in step S03 with the target value corresponding to the level 3. Similarly, in step S08 described above, the processor 20 calculates the SLP transition time by comparing the value calculated in step S07 with the target value corresponding to the level 3.

The target value may not be designated by the level. For example, the user may operate the UI 14 to input specific values of the energy saving target value and the convenience target value. Finer or coarser levels than levels 1 to 5 may be defined.

Hereinafter, the energy saving value and the convenience value in a case where the power saving setting is the second setting (LP2, SLP2) will be described with reference to FIGS. 6 and 7. FIG. 6 shows an example of the energy saving value. An example of the energy saving value is the amount of power consumption. FIG. 7 shows an example of the convenience value. An example of the convenience value is the return time (that is, the standby time). LP2 is 60 minutes and SLP2 is 60 minutes.

FIGS. 6 and 7 show the usage status of the image forming apparatus 10 during a predetermined period from the point in time at which the power saving setting is changed to the second setting. FIG. 6 shows in which mode the image forming apparatus 10 is used during the period. Specifically, the operation time and the amount of power of each mode are shown as an example of the usage status of the image forming apparatus 10. FIG. 7 shows the number of times of returning and the average return time from each of the standby mode, the low power mode, and the sleep mode during the period as an example of the usage status of the image forming apparatus 10 during the period.

FIG. 6 shows a power value [W], an operation time [minutes], and the amount of power [Wh] of each mode. The power value [W] of a certain mode corresponds to the power consumed in the mode and is determined in advance. The operation time of a certain mode is a length of a time that the state of the image forming apparatus 10 is actually the state in the mode during the above period. For example, the operation time of the standby mode is 1800 [minutes] during the above period. The amount of power [Wh] of a certain mode corresponds to the power actually consumed in the mode. The total amount is the actual total amount of power during the above period.

FIG. 6 shows a warm-up mode, a print mode, and a scan mode as an example of the operating mode. A power value of the warm-up mode is the highest among these modes. The standby mode, the low power mode, and the sleep mode are shown. The power value in the sleep mode is the lowest of all the modes.

FIG. 7 shows the return time [seconds], the number of times of returning, and the average return time [seconds] of each mode. The return time from the standby mode, the return time from the low power mode, and the return time from the sleep mode are shown.

A return time of the operation panel and a return time of the fixing device are shown as the return time. The return time of the operation panel is a time required to return the operation panel from each mode. The returning of the operation panel means that a backlight of the operation panel is turned on and an operation using the operation panel can be performed. The return time of the fixing device is a time required to return the fixing device from each mode. The returning of the fixing device means that power is supplied to the fixing device to heat the fixing device until fixing by the fixing device can be per formed.

The return time of the operation panel and the return time of the fixing device are shown for each mode. These return times are determined in advance.

Returning from the standby mode is defined as "0" seconds. The return time from the sleep mode is longer than the return time from the low power mode. This is because the power supplied to each part of the image forming apparatus 10 in the sleep mode is lower than the power supplied in the low power mode or the power is not supplied to a part of the image forming apparatus 10 in the sleep mode.

FIG. 7 shows the number of times of returning from the standby mode, the number of times of returning from the low power mode, and the number of times of returning from the sleep mode.

The average return time is the average value of the return time (that is, the average value of the standby time). Here, as an example, the average return time for the operation panel and the average return time for the fixing device are shown. For the operation panel, the processor 20 calculates the product of the return time and the number of times of returning for each mode, calculates the total of the products of the modes, and divides the total by the total number of times of returning. As a result, the average return time of the operation panel is calculated. The same applies to the average return time for the fixing device.

The average return time of the operation panel is calculated as follows.

{return time from standby mode (0 seconds)×number of times of returning (55 times)+number of times of returning from low power mode (1 second)×number of times of returning (32 times)+return time from sleep mode (3 seconds)×number of times of returning (15)}/(55 times+32 times+15 times)=0.75 seconds The average return time of the fixing device is calculated as follows.

{return time from sleep mode (0 seconds)×number of times of returning (55 times)+return time from low power mode (3 seconds)×number of times of returning (32 times)+return time from sleep mode (5 seconds)×number of times of returning (15)}/(55 times+32 times+15 times) =2.22 seconds The total (8947 [Wh]) shown in FIG. 6 is the energy saving value, and the average return time (0.75 [seconds], 2.22 [seconds]) shown in FIG. 7 is the convenience value.

In step S05 described above, the processor 20 compares the energy saving and convenience values with the target values, and calculates the LP transition time (LP3) of the third setting A based on the comparison result. As described above, the processor 20 calculates the LP transition time of the third setting A based on the energy saving value and the average return time calculated from the usage status of the image forming apparatus 10 (for example, the usage status shown in FIGS. 6 and 7) during a predetermined period from the point in time at which the power saving setting is changed to the second setting.

In the example shown in FIG. 5, the target value of the average return time of the operation panel is designated. In this case, the processor 20 compares the actual average return time calculated as described above with the target value of the average return time in terms of convenience.

The target level 3 is designated, and the target value of the average return time at this time is 1.5 [seconds]. Since the actual average return time shown in FIG. 7 is 0.75 [seconds], the actual average return time is equal to or less than the target value. That is, in a case where the power saving setting is the second setting, the user's goal regarding convenience is achieved.

As shown in FIG. 5, the target value of the amount of power consumption corresponding to the target level 3 is 5000 [Wh]. Since the actual total amount of power shown in FIG. 6 is 8947 [Wh], the actual total amount of power exceeds the target value. That is, in a case where the power saving setting is the second setting, the user's goal regarding energy saving is not achieved.

In a case where the above comparison result is obtained, the processor 20 sets the LP transition time to be shorter than the LP transition time of the second setting and changes the power saving setting to the third setting A including the short LP transition time from the second setting such that an energy saving effect higher than in the second setting is obtained. For example, the processor 20 changes the LP transition time from 60 minutes to 5 minutes. In this case, LP3=5 minutes. LP3 in the third setting A is 5 minutes and SLP2 remains 60 minutes with no change. The value "5 minutes" may be a value corresponding to the difference between the actual total amount of power and the target value or the difference between LP2 and LP3 may be a predetermined value.

FIGS. 8 and 9 show the usage status of the image forming apparatus 10 during a predetermined period from a point in time at which the power saving setting is changed from the second setting to the third setting A. FIG. 8 shows the energy saving value, and FIG. 9 shows the convenience value. The meaning of each value shown in FIG. 8 is the same as the meaning of each value shown in FIG. 6. The meaning of each value shown in FIG. 9 is the same as the meaning of each value shown in FIG. 7. FIG. 8 shows in which mode the image forming apparatus 10 is used during the period. Specifically, the operation time and the amount of power of each mode are shown as an example of the usage status of the image forming apparatus 10. FIG. 9 shows the number of times of returning and the average return time from each of the standby mode, the low power mode, and the sleep mode during the period as an example of the usage status of the image forming apparatus 10 during the period. Similar to the example shown in FIGS. 6 and 7, the amount of power, the total amount of power, and the average return time are calculated during a predetermined period from the point in time at which the power saving setting is changed from the second setting to the third setting A. This calculation is an example of the calculation in step S07.

Since the actual average return time shown in FIG. 9 is 1.15 [seconds], the actual average return time is equal to or less than 1.5 [seconds] which is the target value. That is, in a case where the power saving setting is the third setting A, the user's goal regarding convenience is achieved.

Since the actual total amount of power shown in FIG. 8 is 6964 [Wh], the actual total amount of power exceeds 5000 [Wh] which is the target value. That is, in a case where the power saving setting is the third setting A, the user's goal regarding energy saving is not achieved.

In a case where the above comparison result is obtained, the processor 20 sets the SLP transition time to be shorter than the SLP transition time of the third setting A and changes the power saving setting to the third setting B including the short SLP transition time from the third setting A such that an energy saving effect higher than in the third setting A is obtained. For example, the processor 20 changes the SLP transition time from 60 minutes to 15 minutes. In this case, SLP3=5 minutes. LP3 in the third setting B remains 5 minutes with no change, and SLP3 becomes 5 minutes. The value "5 minutes" may be a value corresponding to the difference between the actual total amount of power and the target value or the difference between SLP2 and SLP3 may be a predetermined value. As described above, the processor 20 calculates the SLP transition time of the third setting B based on the energy saving value and the average return time calculated from the usage status of the image forming apparatus 10 (for example, the usage status shown in FIGS. 8 and 9) during a predetermined period from the point in time at which the power saving setting is changed to the third setting A.

FIGS. 10 and 11 show the usage status of the image forming apparatus 10 during a predetermined period from a point in time at which the power saving setting is changed to the third setting B. FIG. 10 shows the energy saving value, and FIG. 11 shows the convenience value. The meaning of each value shown in FIG. 10 is the same as the meaning of each value shown in FIGS. 6 and 8. The meaning of each value shown in FIG. 11 is the same as the meaning of each value shown in FIGS. 7 and 9. Similar to the example shown in FIGS. 6 and 7, the amount of power, the total amount of power, and the average return time during a predetermined period from a point in time at which the power saving setting is changed from the third setting A to the third setting B are calculated.

Since the actual average return time shown in FIG. 11 is 1.48 [seconds], the actual average return time is equal to or less than 1.5 [seconds] which is the target value. That is, in a case where the power saving setting is the third setting A, the user's goal regarding convenience is achieved.

Since the actual total amount of power shown in FIG. 10 is 4725 [Wh], the actual total amount of power is equal to or less than 5000 [Wh] which is the target value. That is, in a case where the power saving setting is the third setting A, the user's goal regarding energy saving is achieved.

As described above, the power saving setting is changed to the third setting B, and thus, it is possible to achieve the goal designated by the user in terms of both energy saving and convenience.

Thereafter, an optimization loop may be executed, and thus, the power saving setting may be changed from the third setting B to another setting.

As described above, the power saving setting is changed such that the target value is realized based on the usage status of the image forming apparatus 10 and the target value.

The example shown in FIGS. 6 to 11 is only an example of the processing of changing the power saving setting based on the usage status of the image forming apparatus 10. As another example, the processor 20 calculates a time interval in which a job (for example, processing of a print job or the like) is executed within a specific period, and calculates the total of the shortest time interval and a predetermined value (for example, a time determined as a buffer). In a case where the total time is shorter than the transition time currently set in the image forming apparatus 10, the processor 20 changes the transition time to the total time. To give a specific example, in a case where the shortest time interval is 5 minutes and the time defined as the buffer is 3 minutes, the total time is 8 minutes. In a case where the transition time currently set in the image forming apparatus 10 is longer than 8 minutes, the processor 20 changes the transition time to 8 minutes. The time as the buffer may be set by the user or may be set in advance in the image forming apparatus 10. The time interval in which the job is executed is also included in the concept of the usage status of the image forming apparatus 10, and the power saving setting may be changed based on the time interval, or the power saving setting may be changed based on the usage status of the image forming apparatus 10.

The image forming apparatus 10 corresponds to an example of an information processing apparatus. The processing shown in FIG. 3 may not be executed by the image forming apparatus 10 but may be executed by an external apparatus (for example, a PC, a server, or the like) other than the image forming apparatus 10. In this case, the external apparatus corresponds to an example of the information processing apparatus. For example, the external apparatus acquires data indicating the usage status of the image forming apparatus 10, data indicating each setting of power saving, and data indicating the target value from the image forming apparatus 10 via a communication path such as a network, calculates LP3 and SLP3, and transmits the data indicating LP3 and SLP3 to the image forming apparatus 10. The processor 20 of the image forming apparatus 10 controls the power saving of the image forming apparatus 10 according to LP3 and SLP3 calculated by the external apparatus. The data indicating the usage status of the image forming apparatus 10, the data indicating each setting of power saving, and the data indicating the target value may be transmitted from the image forming apparatus 10 to the external apparatus during each predetermined period. LP3 or SLP3 calculated by the external apparatus may be displayed on the display of the external apparatus or the image forming apparatus 10. LP3 and SLP3 calculated by the external apparatus may be input to the image forming apparatus 10 by the user.

In the above-described exemplary embodiment, although it has been described that the image forming apparatus 10 is used as an example of the apparatus, the exemplary embodiment may be applied to an apparatus such as a PC or a display, or may be applied to another apparatus having a sleep mode (for example, home appliances, industrial equipment, or the like).

The function of the image forming apparatus 10 is realized by the cooperation of hardware and software as an example. For example, the processor realizes the function of each apparatus by reading out and executing a program stored in the memory of each apparatus. The program is stored in the memory via a recording medium such as a CD or DVD, or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, which has at least a standby mode, a lower power mode, and a sleep mode, wherein a low-power (LP) transition time for transitioning from the standby mode to the lower power mode and a sleep (SLP) transition time for transitioning from the low power mode to the sleep mode are set, the information processing apparatus comprising:

a processor configured to:

determine whether execution of a process for changing a transition time in a power saving setting based on a usage status of the information processing apparatus is set to be valid;

in response to the execution of the process being set to be valid, change the LP transition time for transitioning from the standby mode to the low power mode from a default first LP transition time to a second LP transition time, and change the SLP transition time for transitioning from the low power mode to the sleep mode from a default first SLP transition time to a second SLP transition time; and after the LP transition time and the SLP transition time are respectively changed to the second LP transition time and the second SLP transition time, calculate a third SLP transition time based on the usage status of the information processing apparatus collected over a predetermined period, wherein the usage status indicates a number of returns from the low power mode to the standby mode and a number of returns from the sleep mode to the standby mode, and set the SLP transition time for transitioning from the standby mode to the low power mode to the third SLP transition time that is shorter than the second SLP transition time.

2. The information processing apparatus according to claim 1, wherein the second LP transition time and the second SLP transition time are power saving settings of another apparatus.

3. The information processing apparatus according to claim 1, wherein the processor is configured to:

determine whether the execution of the process for changing the transition time in the power-saving setting at a time of an initial setting of the information processing apparatus.

4. The information processing apparatus according to claim 2, wherein the processor is configured to:

determine whether the execution of the process for changing the transition time in the power saving setting at a time of an initial setting of the information processing apparatus.

5. The information processing apparatus according to claim 1, wherein the processor is configured to:

display information indicating that the power saving setting of the information processing apparatus is changed to the third SLP transition time on a display.

6. The information processing apparatus according to claim 2, wherein the processor is configured to:

display information indicating that the power saving setting of the information processing apparatus is changed to the third SLP transition time on a display.

7. The information processing apparatus according to claim 3, wherein the processor is configured to:

display information indicating that the power saving setting of the information processing apparatus is changed to the third SLP transition time on a display.

8. The information processing apparatus according to claim 4, wherein the processor is configured to:

display information indicating that the power saving setting of the information processing apparatus is changed to the third SLP transition time on a display.

9. The information processing apparatus according to claim 5, wherein the processor is configured to:

display the information indicating that the power saving setting of the information processing apparatus is changed to the third SLP transition time on a login screen first displayed after the power saving setting of the information processing apparatus is changed to the third SLP transition time.

10. A non-transitory computer readable medium storing a program causing a computer an information processing apparatus which has at least a standby mode, a lower power mode, and a sleep mode to execute a process, wherein a low-power (LP) transition time for transitioning from the standby mode to the lower power mode and a sleep (SLP) transition time for transitioning from the low power mode to the sleep mode are set, the process comprising:

determining whether execution of a process for changing a transition time in a power saving setting based on a usage status of the information processing apparatus is set to be valid;

in response to the execution of the process being set to be valid, changing the LP transition time for transitioning from the standby mode to the low power mode from a default first LP transition time to a second LP transition time, and changing the SLP transition time for transitioning from the low power mode to the sleep mode from a default first SLP transition time to a second SLP transition time; and after the LP transition time and the SLP transition time are respectively changed to the second LP transition time and the second SLP transition time, calculating a third SLP transition time based on the usage status of the information processing apparatus collected over a predetermined period, wherein the usage status indicates a number of returns from the low power mode to the standby mode and a number of returns from the sleep mode to the standby mode, and setting the SLP transition time for transitioning from the standby mode to the low power mode to the third SLP transition time that is shorter than the second SLP transition time.

* * * * *